United States Patent [19]

Shimizu et al.

[11] Patent Number: 4,910,507
[45] Date of Patent: Mar. 20, 1990

[54] INTERFACE MODULE FOR CONNECTING COLLISION DETECTION LAN USER TERMINALS TO DIFFERENT ACCESS MODE SWITCHING NETWORK

[75] Inventors: Hiroshi Shimizu; Tsurayuki Kawatoko; Hidenori Sakamoto; Yoshihiko Katsura; Akihiko Obayashi, all of Tokyo, Japan

[73] Assignee: NEC Corporation, Tokyo, Japan

[21] Appl. No.: 246,061

[22] Filed: Sep. 19, 1988

[30] Foreign Application Priority Data

Sep. 18, 1987 [JP] Japan ................................ 62-233839

[51] Int. Cl.⁴ ............................................. H04L 11/00
[52] U.S. Cl. ........................ 340/825.500; 340/825.050; 370/85.2; 370/94.1
[58] Field of Search ...................... 340/825.06, 825.05, 340/825.08, 825.5, 825.51; 361/92, 93, 94, 95, 493; 370/31, 32, 60, 61, 85, 94; 375/7, 121; 455/78; 371/47, 71

[56] References Cited

U.S. PATENT DOCUMENTS

| | | | |
|---|---|---|---|
| 3,843,834 | 10/1974 | Burke | 370/31 |
| 4,259,663 | 3/1981 | Gable | 340/825.5 |
| 4,282,512 | 8/1981 | Boggs et al. | 340/825.5 |
| 4,292,623 | 9/1981 | Eswaran et al. | 340/825.5 |
| 4,519,074 | 5/1985 | Basile | 340/825.5 |
| 4,617,565 | 10/1986 | Nakata et al. | 340/825.5 |
| 4,706,082 | 11/1987 | Miesterfeld et al. | 340/825.51 |
| 4,736,394 | 4/1988 | Giovanelli et al. | 340/825.5 |
| 4,742,349 | 5/1988 | Miesterfeld et al. | 340/825.5 |
| 4,751,701 | 6/1988 | Roos et al. | 370/85 |

Primary Examiner—Donald J. Yusko
Assistant Examiner—E. O. Pudpud
Attorney, Agent, or Firm—Sughrue, Mion, Zinn, Macpeak & Seas

[57] ABSTRACT

In an interface module for connecting user terminals of the carrier sense multiple access collision detection (CSMA/CD) local area network (LAN) to a different access mode switching network, a transmit buffer is connected at one end through a transmit data channel to a user terminal and connected at the other end to a desired swtching system. A receive buffer is connected at one end to the switching system to store a receive packet supplied from it. An OR gate is provided having a first input connected to the transmit data channel, a second input connected to the other end of the receive buffer and an output connected through a receive data channel to the user terminal. A detector circuit detects when a transmit packet is received from the user terminal. A control circuit responds to the output of detector circuit to enable the transmit buffer to store the transmit packet from the user terminal and further enables the receive buffer to forward the stored receive packet to the OR gate in the absence of a transmit packet detected by the detector circuit. The control circuit detects a simultaneous occurrence of a receive packet being forwarded from the receive buffer and a transmit packet being detected by the detector means and causes a collision-presence signal to be supplied to the user terminal through a signalling channel.

18 Claims, 4 Drawing Sheets

INTERFACE MODULE FOR CONNECTING COLLISION DETECTION LAN USER TERMINALS TO DIFFERENT ACCESS MODE SWITCHING NETWORK

BACKGROUND OF THE INVENTION

The present invention relates to an interface module for connecting user terminals of a collision detection local area network to a switching network having a different access mode.

When it is desired to connect a user terminal of a collision detection local area network having an IEEE 802.3 standard access interface, for example, to a switching network having different access protocols, the simplest approach that minimizes modifications of the terminals would be to construct an interface module with transmit and receive buffers which are connected to a desired switching network, an access controller connected to the transmit and receive buffers, and a serial interface adapter connected thereto. A pair of transceivers are connected in a coaxial cable bus. One of the transceivers is connected to the user terminal and the other transceiver to the serial interface adapter.

However, such a solution would result in a bulky and expensive interface module.

SUMMARY OF THE INVENTION

The object of the present invention is therefore to provide an interface module for a collision detection local area network which is simple and inexpensive and does not require the user terminal to modify its structure to adapt it to a different access system.

According to a first aspect of the present invention, the interface module comprises a transmit buffer connected at one end through a transmit data channel to a user terminal and connected at the other end to a desired switching system. A receive buffer is connected at one end to the switching system to store a receive packet supplied from it. An OR gate is provided having a first input connected to the transmit data channel, a second input connected to the other end of the receive buffer and an output connected through a receive data channel to the user terminal. A detector circuit detects when a transmit packet is received from the user terminal. A control circuit responds to the output of detector circuit to enable the transmit buffer to store the transmit packet from the user terminal and further enables the receive buffer to forward the stored receive packet to the OR gate in the absence of a transmit packet detected by the detector circuit. The control circuit detects a simultaneous occurrence of a receive packet being forwarded from the receive buffer and a transmit packet being detected by the detector means and causes a collision-presence signal to be supplied to the user terminal through a signalling channel.

Collision detection type LAN user terminals can therefore be connected to a switching network of non-collision detection type without expensive transceivers and access controllers which would otherwise be needed. The interface module can be implemented by simple logic circuitry and so it can be kept small. Flow control can also be provided between the transmit buffer and the user terminal. A further advantage is that when a data collision occurs between a transmit packet from the user and a receive packet from the switching network, repeated collisions can be avoided by informing the user of the occurrence of a collision. Further, the packet's dwell time in the receive buffer can be shortened, improving the buffer utilization efficiency.

According to another aspect, the interface module of the present invention comprises a transmit buffer connected to a switching system, a receive buffer connected to the switching system to store a receive packet transmitted therefrom, a first OR gate having a first input connected to an output of the receive buffer, and a second OR gate. An interface adapter is provided having a first data input port connected to the user terminal through a transmit data channel, a first data output port connected to the user terminal through a receive data channel, a second data input port connected to the output of the first OR gate, a second data output port connected to a second input of the first OR gate and to the input of the transmit buffer, a control input port connected to the output of the second OR gate for receiving a receive enable pulse applied thereto, and a control output port connected to a first input of the second OR gate. The interface adapter receives a transmit packet having a line code format through the first data input port and converts the line code format of the received packet to a binary logic code and applies the converted packet to the second data output port. Simultaneously, a transmit enable pulse is supplied from the interface adapter to the control output port. The interface adapter is responsive to the receive enable pulse applied to the control input for converting a binary logic code format of a packet supplied to the second data input port into a line code format and supplying the converted packet to the first output port. A collision signalling circuit is connected through a signalling channel to the user terminal for generating a collision-presence signal in response to a signal supplied from a control circuit. This control circuit causes the transmit to operate in a write mode to store the packet appearing at the second data output port in response to the transmit enable pulse and causes the receive buffer to forward a packet therefrom to the first OR gate in the absence of the transmit enable pulse and simultaneously supplies the receive enable pulse to a second input of the second OR gate, and supplies a control signal to the collision signalling circuit to cause it supply the collision-presence signal to the signalling channel when the transmit enable pulse occurs in the presence of a receive packet being forwarded by the receive buffer to the first OR gate.

BRIEF DESCRIPTION OF THE DRAWINGS

The present invention will be described in further detail with reference to the accompanying drawings, in which.

DETAILED DESCRIPTION

Figure 1:
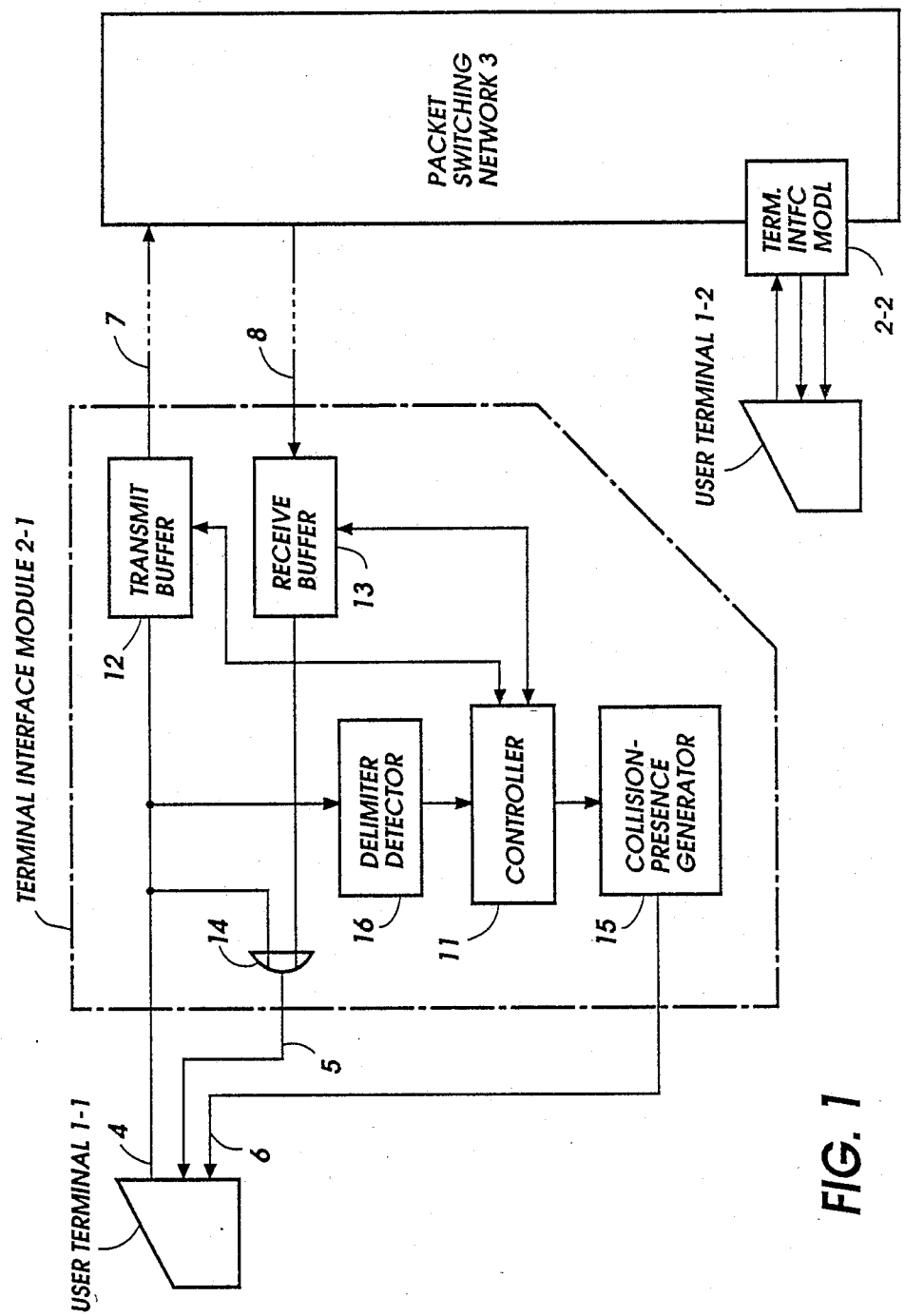
FIG. 1 is a block diagram of a terminal interface module according to a first embodiment of the present invention.
Figure 3:
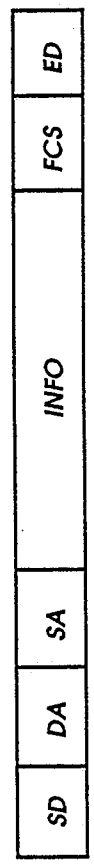
FIG. 3 is a data format used in the first embodiment of the invention.

FIG. 1 is an illustration of a packet-switched system in which terminal interface modules 2-1 and 2-2 of the present invention are shown to permit user terminals 1-1 and 1-2 of carrier sense multiple access collision detection (CSMA/CD) local area network (LAN) to be connected to a packet switching network 3 of non-collision detection access mode. The user terminal 1-1 is located remote from the switching network 3 and connected thereto via the interface module 2-1 which is located adjacent the user terminal 1-1. The connection between the module 2-1 and the switching network 3 is by means of subscriber loops 7 and 8. The other user terminal 1-2 is located adjacent the switching network 3 and is directly connected to an interface module 2-2 which is located within the switching network 3. Each of the interface modules 2 comprises a controller 11, a transmit buffer 12 having an input port connected to the associated user terminal 2 via a transmit data channel 4 and an output port connected via the subscriber loop 7 to the switching network 3. A receive buffer 13 is provided having an input port connected from the switching network 3 via the subscriber loop 8 and an output port connected through an OR gate 14 and a receive data channel 5 to the associated user terminal 1. Via the OR gate 14, the transmit data channel 4 is connected to the receive data channel 5. The transmit and receive buffers 12 and 13 are both controlled by the controller 11 to which a delimiter detector 16 supplies a an output in response to the detection of a delimiter from a transmit packet received from the associated user terminal 1. Controller 11 detects a collision between packets and directs a collision-presence signal generator 15 to supply a collision-presence signal through a signalling channel 6 to the associated user terminal 1. As shown in FIG. 3, each packet comprises a starting delimiter SD for signifying the beginning of the packet, an ending delimiter ED signifying the end of the packet, a destination address DA, a source address SA, a user information field INFO and a frame check sequence FCS.

In FIG. 1, a transmit packet from a user terminal 1 is sent on the transmit data channel 4 and stored into the transmit buffer 12 on the one hand and fed back through OR gate 14 to the receive data channel 5. The transmission of the signal back to the user terminal is to conform to the access mode of the cable-bus local area network. The starting delimiter of the transmit packet is detected by the delimiter detector 16 and is communicated to the control circuit 11. Control circuit 11 enables the transmit buffer 12 in a write mode to store the transmit packet. This write mode of operation is continued until the delimiter detector 16 detects the ending delimiter ED of the received transmit packet. Controller 11 switches the transmit buffer 12 to a read mode to read the stored transmit packet out of the buffer 12 onto the subscriber loop 7. On the other hand, a receive packet from the switching network 3 is supplied through the subscriber loop 8 and is stored into the receive buffer 13 and is communicated to the control circuit 11. If a transmit packet is not received from the user terminal simultaneously with the arrival of the receive packet, controller 11 proceeds to read the receive packet from the receive buffer 13 and supplies it through OR gate 14 to the receive data channel 5.

If the delimiter detector 16 detects the starting delimiter of a transmit packet while a receive packet is being transmitted to the user terminal, control circuit 11 recognizes this situation as a collision and activates the collision-presence signal generator 15 to communicate this fact to the associated user terminal by way of the signalling channel 6.

In the event of a collision, the remainder of the transmit packet in the transmit buffer 12 is discarded to prevent it from being occupied with useless data, while the receive buffer 13 is given priority to retransmit the receive packet to the user terminal following a predetermined delay from the time of occurrence of the collision. In this way, loss of receive data is prevented. The predetermined delay time is equal to or smaller than the minimum amount of time required for the associated user terminal 1 to retransmit a packet. This not only prevents packets from encountering collision again but also reduces the packet's dwell time in the receive buffer 13 to improve the utilization efficiency of the receive buffer 13. If the transmit buffer 12 is overflowed, control circuit 11 detects this condition and causes the receive buffer 13 to apply a dummy (carrier) signal through OR gate 14 to the receive data channel 5. The associated user terminal detects a "carrier sense" mode (with the cable bus system the carrier sense mode corresponds to a condition in which another terminal is transmitting a packet) and takes no further action to transmit a packet. As soon as the transmit buffer 12 becomes ready to receive packets, controller 11 senses this condition and causes the receive buffer 13 to discontinue the transmission of the dummy signal. In this way, flow control between the user terminal and the interface module can be achieved. For user terminals designed to detect collision-presence signals following the transmission of a packet, control circuit 11 activates the collision-presence signal generator 15 in response to the detection of an ending delimiter ED by the delimiter detector 16.

Figure 2:
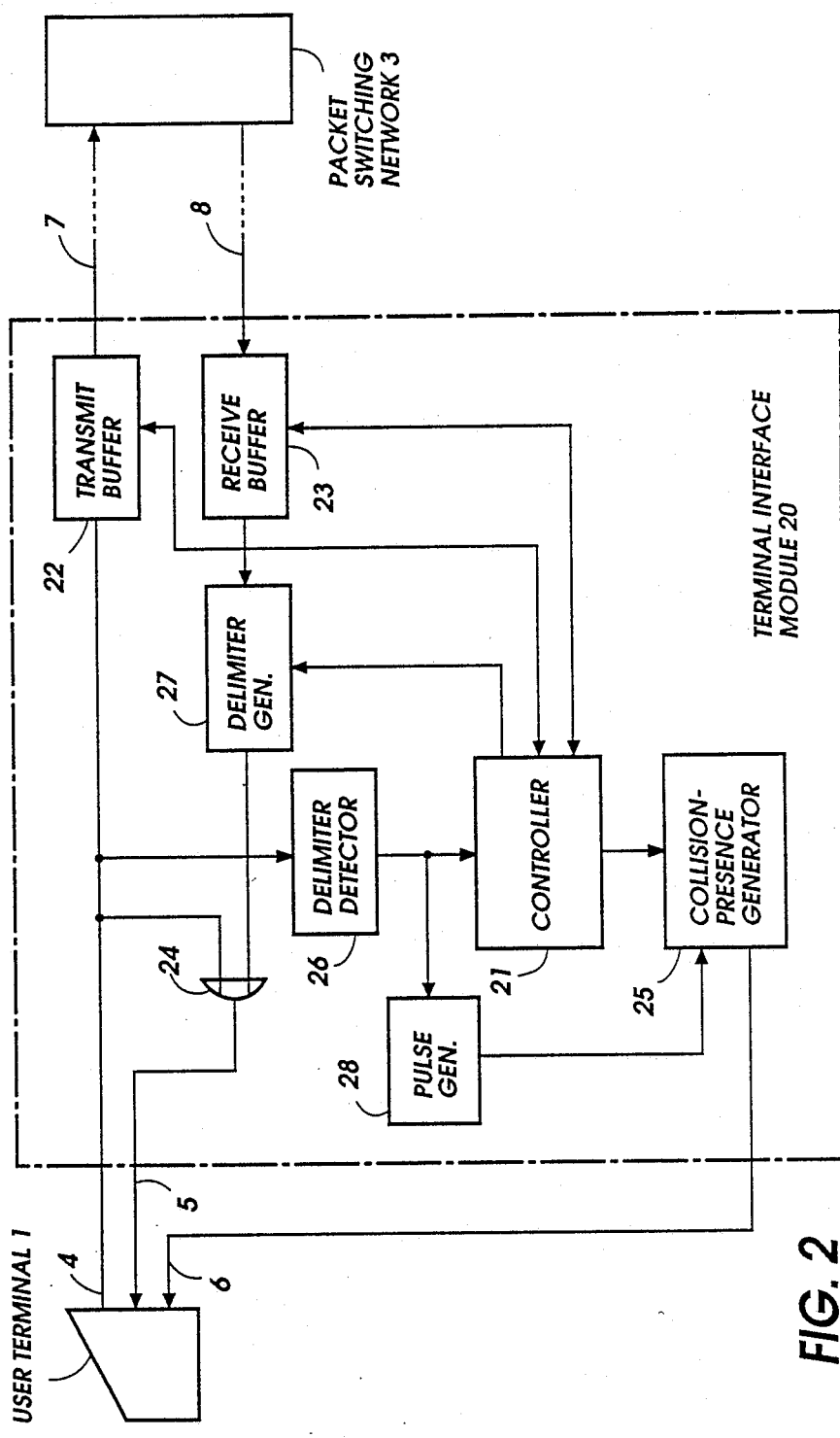
FIG. 2 is a block diagram of a terminal interface module according to a second embodiment of the present invention.

FIG. 2 is a block diagram of a terminal interface module 20 according to a second embodiment of the present invention which is suitable for a network where no delimiters are used between buffers and the switching network 3. In this embodiment, the starting and ending delimiters of every transmit packet from the user terminal 1 are removed by a delimiter detector 26 and a receive packet stored in a receive buffer 23 is appended by starting and ending delimiters generated by a delimiter generator 27. A pulse generator 28 is provided which responds to the detection of an ending delimiter detected by the delimiter detector 26 by generating a single pulse. During the presence of this pulse, a collision-presence signal generator 25 sends a collision-presence signal to the user terminal through the signalling channel 6 if enabled by a controller 21 upon detection of a collision. If the packet exchanged between the terminal and the interface module is in serial form, the provision of a serial-to-parallel converter in a delimiter detector 26 and the provision of a parallel-to-serial converter in the delimiter generator 27 allow transmit buffer 22 and receive buffer 23 to reduce their memory access speeds.

Figure 5:
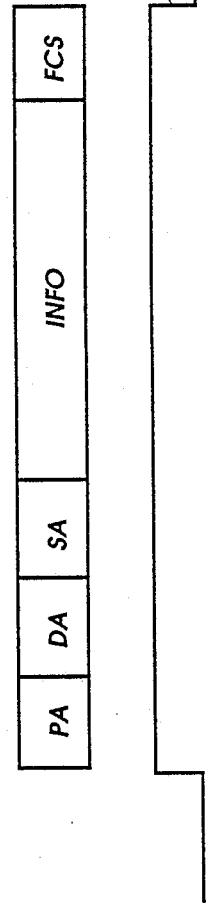
FIG. 5 is a data format used in the embodiment of FIG. 4.
Figure 4:
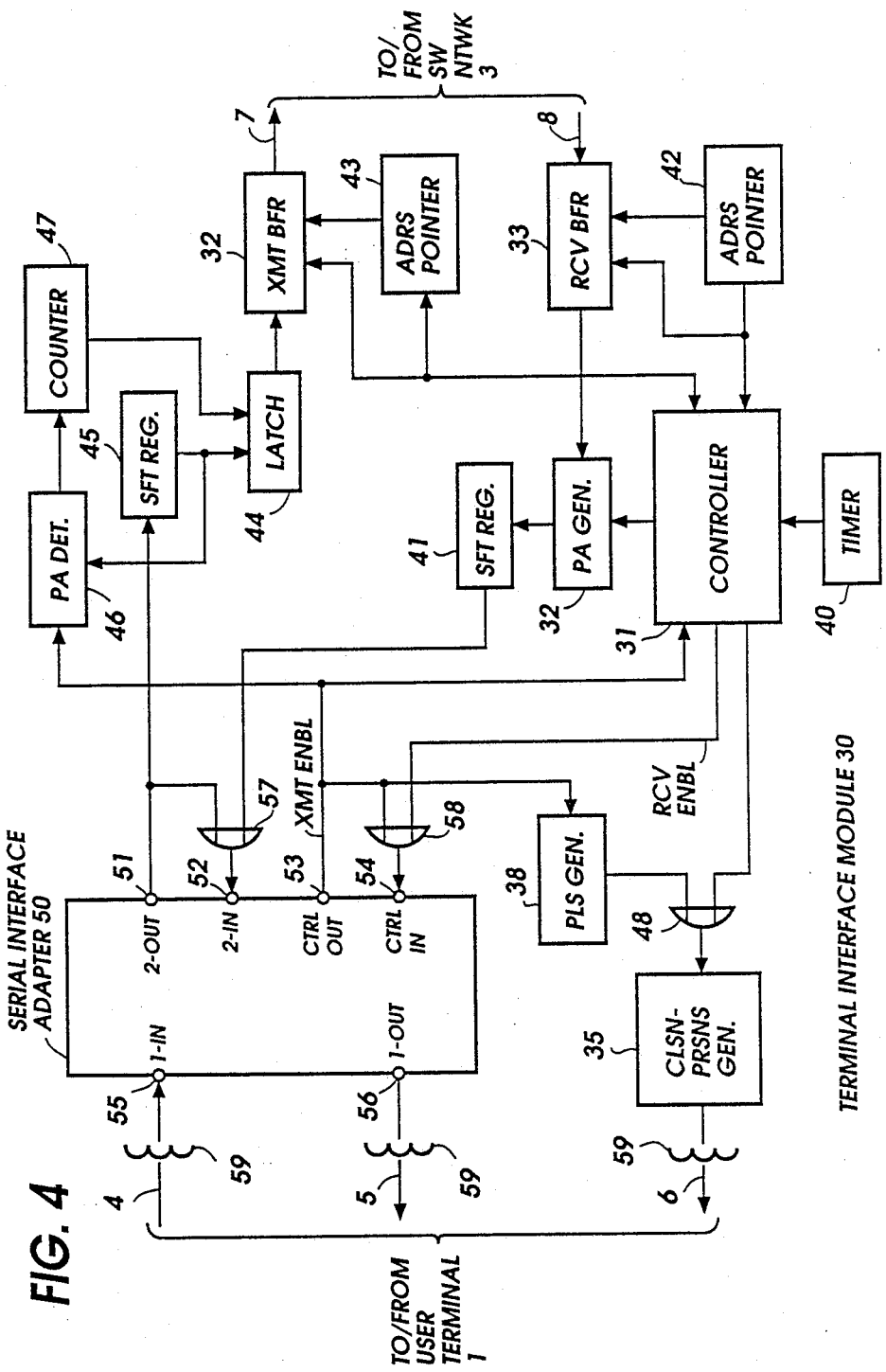
FIG. 4 is a block diagram of a terminal interface module according to a third embodiment of the present invention.

FIG. 4 is a block diagram of an interface module according to a third embodiment of the present invention which handles packets of the format specified in accordance with the IEEE 802.3 standard. As shown in FIG. 5, the packet used in this embodiment comprises a preamble PA, a destination address DA, a source address SA, a user information field INFO and a frame check sequence FCS. As illustrated in FIG. 4, the interface module 30 includes a serial interface adapter 50 constructed of known interface LSI chips. A transmit packet on transmit data channel 4 is supplied through transformer 59 to an input port 55 of the serial interface adapter 50. Serial interface adapter 50 converts the line code format of the transmit packet to a binary logic code format (non return-to-zero), feeds an output port 51 and applies a logic-1 transmit enable pulse of the same duration as the packet (see FIG. 5) to an output control port 53. When the serial interface adapter 50 is supplied with a logic-1 receive enable 60 (FIG. 5) at an input control port 54 and a receive packet at a data input port 52, it converts the binary logic code of the latter into a line code format and feeds a data output port 56 which is coupled through transformer 59 to the receive data channel 5. Transmit packets from the output port 51 are supplied to a shift register 45 on the one hand and through an OR gate 57 to an input port 52 of the serial interface adapter 50. The transmit enable pulse is supplied to control circuit 31 and a pulse generator 38 which in turn supplies a single pulse in response to the trailing edge of this transmit enable pulse through an OR gate 48 to a collision-presence signal generator 35. Collision-presence signal generator 35 responds to the pulse from pulse generator 38 and to a collision detection signal from controller 31 by applying a collision-presence signal to the signalling channel 6 via transformer 59. The transmit packet stored into the shift register 45 is converted to parallel form and supplied to a latch 44 and to a preamble detector 46. The preamble detector 46 is enabled in response to the transmit enable pulse from the serial interface adapter 50 to detect a preamble PA contained in the transmit packet stored in the shift register 45. A counter 47 is initialized in response to an output signal from the preamble detector 46 to start a count operation and supplies a clock pulse to the latch 44 in synchronism with each word of the transmit packet. The transmit packet in the latch 44 is stored into transmit buffer 32 in the form of a wordorganized structure. If the preamble PA is not required by the switching network 3, it can be eliminated from the packet by switching the transmit buffer 32 to a write mode immediately after the packet leaves the buffer 32. During the time no transmit enable pulse is supplied to the control circuit 31 from the output control port 53, packets are read out of the receiver buffer 33 into a preamble generator 32 where a preamble is generated and appended to the receive packet leaving the buffer 33. The receive packet is then supplied to a shift register 41 where it is converted to serial form and fed through the OR gate 57 to the input port 52 of the serial interface adapter 50. Control circuit 13 supplies a receive enable pulse through OR gate 58 to an input port 54 of the adapter 50 in response to the receive packet being supplied to the input port 52 of the serial interface adapter 50. If the control circuit 31 receives a transmit enable pulse during the time it sends a receive enable pulse to the serial interface adapter 50, it recognizes that a collision has occurred and activates the collision-presence signal generator 35 through OR gate 48. When this occurs, the control circuit 31 stops reading the contents of the receive buffer 32, causes a receive buffer pointer 42 to return to a read address point immediately prior to the occurrence of the collision and activates a timer 40. When the timer 40 generates an output indicating that a predetermined retransmit time interval has elapsed, the control circuit 31 reactivates the receive buffer 33 for retransmission of the receive packet. In a similar manner, the control circuit 31 causes a transmit buffer pointer 43 to return to a write address point immediately prior to the occurrence of the collision to discard the transmit packet stored in the transmit buffer 32 at the instant the collision occurred. If the amount of data stored in the transmit buffer 32 exceeds beyond a prescribed level and is thus not ready to receive packets and if no receive packets are being sent to the user terminal, the control circuit 31 applies a receive enable pulse to the serial interface adapter 50 to cause it to transmit a dummy (carrier) signal indicating that the transmit buffer is not ready to receive to the user terminal to prevent it from transmitting a packet.

It will be seen from the above description that the collision detection type LAN user terminals can be connected to a switching network of noncollision detection type without expensive transceivers and access controllers which would otherwise be needed. In addition, since the interface module can be implemented by simple logic circuitry, it can be kept small and flow control can also be provided between the transmit buffer and the user terminal. A further advantage is that since priority is given to the interface module when a data collision occurs between the user terminal and the interface module, repeated collisions can be avoided and the packet's dwell time in the receive buffer can be shortened, improving the buffer utilization efficiency.

What is claimed is:

1. An interface module for a user terminal of the type which is adapted to be connected to a collision detection local area network, comprising:
   a transmit buffer connected at one end through a transmit data channel to said user terminal and connected at the other end to a switching system;
   a receive buffer connected at one end to said switching system to store a receive packet therefrom;
   an OR gate having a first input connected to said transmit data channel, a second input connected to the other end of said receive buffer, and an output connected through a receive data channel to said user terminal;
   detector means for detecting when a transmit packet is received from said user terminal;
   control means for enabling said transmit buffer to store said transmit packet therein when same is detected by said detector means, enabling said receive buffer to forward the stored receive packet to said second input of said OR gate in the absence of a transmit packet detected by said detector means and for detecting a simultaneous occurrence of a receive packet being forwarded from said receive buffer and a transmit packet being detected by said detector means; and
   means for supplying a collision-presence signal through a signalling channel to said user terminal in response to the detection of said simultaneous occurrence of said receive and transmit packets.

2. An interface module as claimed in claim 1, wherein said control means causes said transmit buffer to discard a transmit packet in response to the detection of said simultaneous occurrence of said receive and transmit packets.

3. An interface module as claimed in claim 1, wherein said control means causes said receive buffer to retransmit a receive packet stored therein in response to the detection of said simultaneous occurrence of said receive and transmit packets.

4. An interface module as claimed in claim 3, wherein the time taken to initiate the retransmission of said receive packet is equal to or smaller than a minimum amount of time taken by said user terminal to retransmit a packet.

5. An interface module as claimed in claim 1, 2 or 3, wherein a carrier is supplied to said user terminal through said receive data channel when said transmit buffer is not ready to receive packets and a receive packet is not forwarded from said receive buffer.

6. An interface module as claimed in claim 1, 2 or 3, wherein a delimiter is removed from a transmit packet before being stored into said transmit buffer.

7. An interface module as claimed in claim 1, 2 or 3, wherein said transmit packet is converted to parallel form and stored into said transmit buffer in the parallel form.

8. An interface module as claimed in claim 1, 2 or 3, wherein a delimiter is appended to a receive packet forwarded from said receive buffer before being supplied to said receive data channel.

9. An interface module as claimed in claim 1, 2 or 3, wherein said collision-presence signal is transmitted following the reception of a transmit packet from said user terminal.

10. An interface module for a user terminal of the type which is adapted to be connected to a collision detection local area network, comprising:
   a transmit buffer connected to a switching system;
   a receive buffer connected to said switching system to store a receive packet transmitted therefrom;
   a first OR gate having a first input connected to an output of said receive buffer;
   a second OR gate;
   an interface adapter means having:
      first data input port connected to said user terminal through a transmit data channel;
      a first data output port connected to said user terminal through a receive data channel;
      a second data input port connected to an output of said first OR gate;
      a second data output port connected to a second input of said first OR gate and to an input of said transmit buffer;
      a control input port connected to an output of said second OR gate for receiving a receive enable pulse applied thereto; and
      a control output port connected to a first input of said second OR gate, said interface adapter means receiving a transmit packet having a line code format through said first data input port, converting the line code format of the received packet to a binary logic code and applying the converted packet to said second data output port and for simultaneously applying a transmit enable pulse to said control output port, said interface adapter means being responsive to said receive enable pulse applied to said control input port for converting a binary logic code format of a packet supplied to said second data input port into a line code format and supplying the converted packet to said first output port;
   a collision signalling circuit connected through a signalling channel to said user terminal for generating a collision-presence signal; and
   a control circuit for causing said transmit buffer to operate in a write mode to store the packet appearing at said second data output port in response to said transmit enable pulse and for causing said receive buffer to forward a packet therefrom to said first OR gate in the absence of said transmit enable pulse and simultaneously supplying said receive enable pulse to a second input of said second OR gate, and for causing said collision signalling circuit to supply said collision-presence signal to said signalling channel when said transmit enable pulse occurs in the presence of a receive packet being forwarded by said receive buffer to said first OR gate.

11. An interface module as claimed in claim 10, wherein said control circuit interrupts the write mode of operation of said transmit buffer when said transmit enable pulse occurs in the presence of said packet being forwarded from said receive buffer and discards the transmit packet leaving said second data output port.

12. An interface module as claimed in claim 10 or 11, further comprising a retransmit timer, wherein said control circuit activates the retransmit timer when said transmit enable pulse occurs in the presence of said receive data signal being forwarded from said receive buffer and initiates the retransmission of a receive packet from said receive buffer at the instant said retransmit timer indicates a prescribed value.

13. An interface module as claimed in claim 12, wherein said prescribed value is equal to or smaller than a minimum amount of time taken by said user terminal to retransmit a packet.

14. An interface module as claimed in claim 10 or 11, wherein said control circuit supplies said receive enable pulse to said second OR gate (58) when said transmit buffer is not ready to receive a packet during the time no receive packet is being forwarded from said receive buffer.

15. An interface module as claimed in claim 10 or 11, further comprising a preamble detector for detecting a preamble in a transmit packet leaving said second data output port, and wherein said control circuit causes said transmit buffer to operate in the write mode following the detection of a preamble by said preamble detector.

16. An interface module as claimed in claim 10 or 11, further comprising a preamble detector for detecting a preamble in a transmit packet leaving said second data output port and a series-to-parallel converter connected to said second data output port for converting a serial input of said transmit packet into a parallel output and applying the parallel output to said receive buffer in response to the detection of a preamble by said preamble detector.

17. An interface module as claimed in claim 10 or 11, further comprising a preamble generator connected to the output of said receive buffer for inserting a preamble to a receive packet leaving said receive buffer.

18. An interface module as claimed in claim 10 or 11, further comprising a pulse generator connected to said control output port for generating a single pulse in response to the trailing edge of said transmit enable pulse and a third OR gate connected to receive said single pulse from said pulse generator and an output signal generated by said control circuit when said transmit enable pulse occurs in the presence of a receive packet being forwarded by said receive buffer to said first OR gate, said third OR gate activating said collision signalling circuit to supply said collision-presence signal to said signalling channel.

* * * * *